United States Patent

[11] 3,583,741

| [72] | Inventors | Werner Breitschwerdt<br>Stuttgart-Botnang;<br>Gunter Gmeiner; Christian Grabner,<br>Sindelfingen; Gerhard Sigmund, Stuttgart-<br>Vaihingen, all of, Germany |
|---|---|---|
| [21] | Appl. No. | 804,850 |
| [22] | Filed | Mar. 6, 1969 |
| [45] | Patented | June 8, 1971 |
| [73] | Assignee | Daimler-Benz Aktiengesellschaft<br>Stuttgart-Unterturkheim, Germany |
| [32] | Priority | Mar. 6, 1968 |
| [33] | | Germany |
| [31] | | P 16 53 964.3 |

[54] SAFETY DOOR LOCK FOR AUTOMOTIVE VEHICLES HAVING INERTIA EQUALIZING MEANS
12 Claims, 7 Drawing Figs.

[52] U.S. Cl............................................. 292/216, 292/210

[51] Int. Cl............................................. E05c 3/36
[50] Field of Search............................................. 292/210, 216, 1.0U376

[56] References Cited
UNITED STATES PATENTS

| 2,864,641 | 12/1958 | Leslie............................ | 292/U-376 |
| 2,872,241 | 2/1959 | Shelden......................... | 292/210X |
| 3,421,785 | 1/1969 | Slattery......................... | 292/216 |

Primary Examiner—Ernest R. Purser
Attorney—Craig, Antonelli, Stewart and Hill

ABSTRACT: Lock arrangement for motor vehicle doors wherein a weighted pivot lever is spring biased into position with respect to the operating members of the lock so as to move into contact therewith against the opening direction thereof on interpose itself into the path of movement thereof in the opening direction in response to application of acceleration shocks thereto.

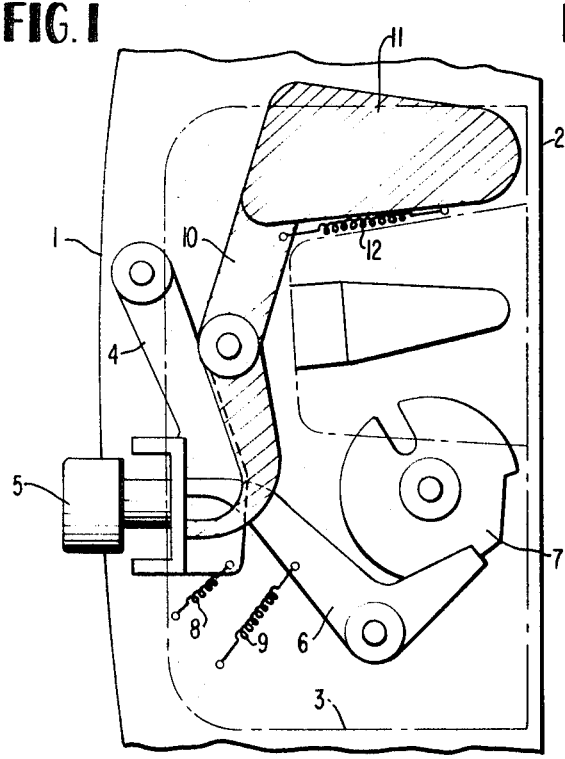
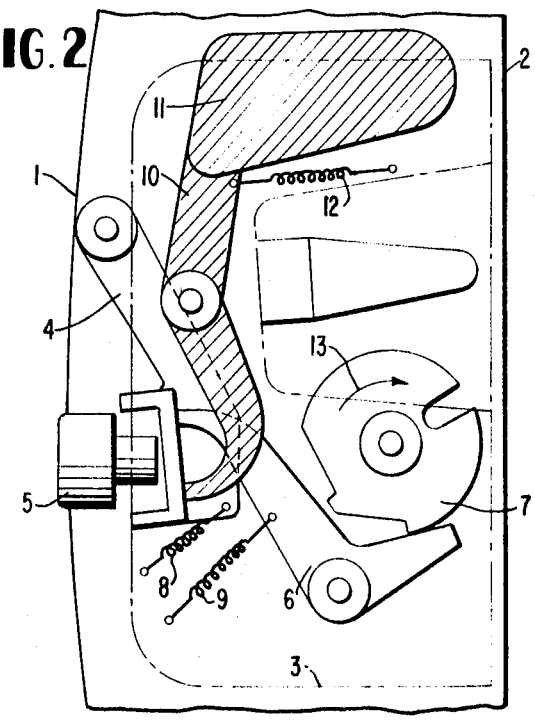
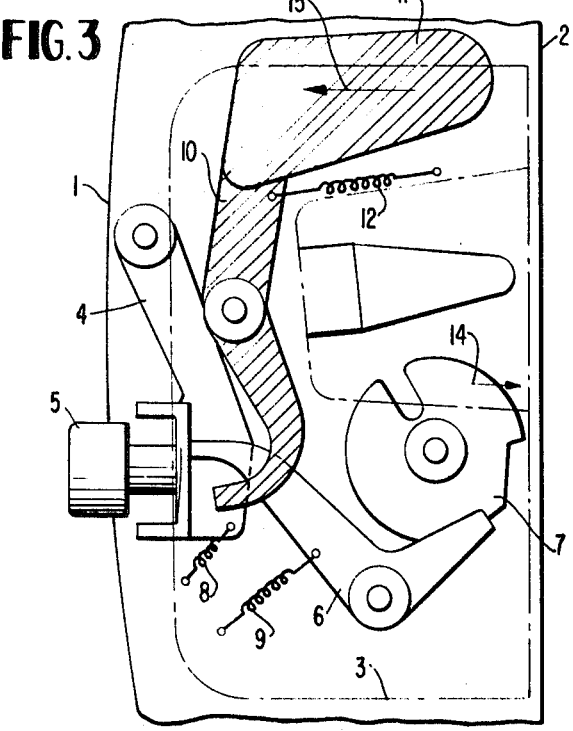
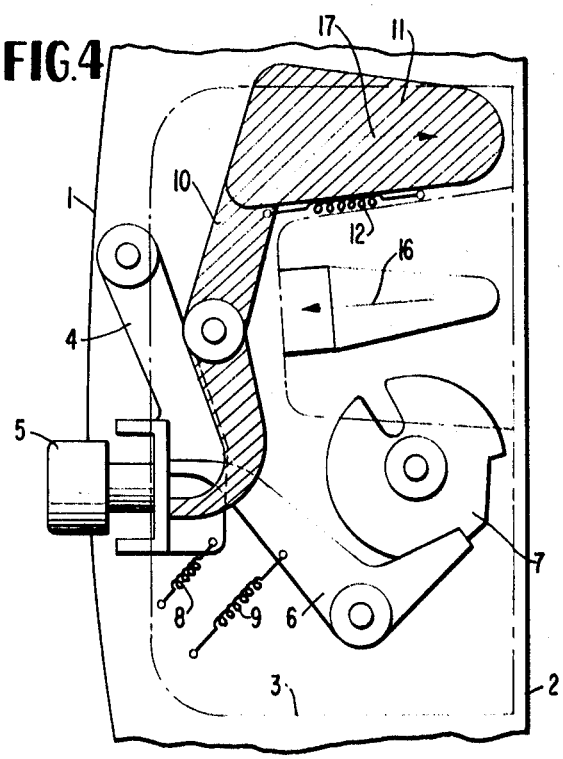

INVENTORS
WERNER BREITSCHWERDT
GÜNTER GMEINER
CHRISTIAN GRABNER
GERHARD SIGMUND

BY

ATTORNEYS

SAFETY DOOR LOCK FOR AUTOMOTIVE VEHICLES HAVING INERTIA EQUALIZING MEANS

The invention relates to a lock, especially a door lock for automotive vehicles.

The conventional door locks for vehicles exhibit the disadvantage that they can open spontaneously when slamming the door shut and particularly in case of accidents, without there being any detectable damage. The invention is based on the objective of avoiding this disadvantage.

Starting with the realization that the spontaneous opening of the locks is, in most cases, due to high accelerations of the masses of the movable parts of the lock, especially of the outer door lock button, the suggestion is advanced for solving this problem to provide, at lease for those movable parts which are of importance from a weight point of view, devices for compensating or balancing the inertial forces and/or devices for preventing a movement of locking members due to inertial forces. Thereby, the forces created by the high accelerations are either compensated, or the movable parts are prevented from executing movements due to these forces.

In order to equalize or balance the inertial forces, a two-armed lever can be provided which is disposed in the lock housing, one arm of which lever rests on the lock mechanism providing a force against the opening direction thereof, and the other, free arm of which lever carries a counterweight. Since the movable part of the lock mechanism which is of greatest importance, weightwise, is the outer lock button, it can be sufficient to have a spring press one arm of the lever against the outer lock button of the lock mechanism. In order to avoid too complicated a construction, it can be sufficient to dimension the counterweight in accordance with a selected acceleration value.

In order to prevent a spontaneous opening of the lock by blocking the movement caused by inertial forces, a lever can be rotatably mounted in the lock housing, which lever, upon the occurrence of accelerations in the direction of the opening motion of the lock mechanism, blocks the latter by formfitting engagement. Suitably, the lever can be held in its rest position by spring force.

An extremely advantageous embodiment of the invention is obtained—since no large counterweights need be provided—by employing an asymmetrical two-armed toggle lever, one arm of which is placed after a rotation due to acceleration, in front of an abutment or stop on the outer lock button of the lock mechanism. This embodiment of the invention is particularly suitable for space-saving, compact constructions.

It is an object of the present invention to provide a lock arrangement for motor vehicle doors which eliminates or substantially avoids the difficulties inherent in known devices of a similar type.

It is another object of the invention to provide a lock arrangement for motor vehicle doors which prevents the possibility of spontaneous, inadvertant opening due to shocks thereto.

It is a further object of the present invention to provide a lock arrangement for motor vehicle doors which avoids inadvertent opening due to shocks thereto by relatively simple means.

It is still another object of the present invention to effectively counterbalance the forces in lock arrangements for vehicle doors resulting from shocks applied thereto and thereby eliminate the possibility of inadvertent opening thereof.

These and other objects, features and advantages will become apparent from the following detailed description thereof when taken in conjunction with the accompanying drawings, which illustrate two embodiments of the invention, and wherein:

FIG. 1 shows a car door lock in the locked position, equipped according to this invention;

FIG. 2 illustrates the door lock of FIG. 1 in the opened position;

FIGS. 3 and 4 show the door lock of FIG. 1 subjected to varying directions of acceleration;

Figure 5:
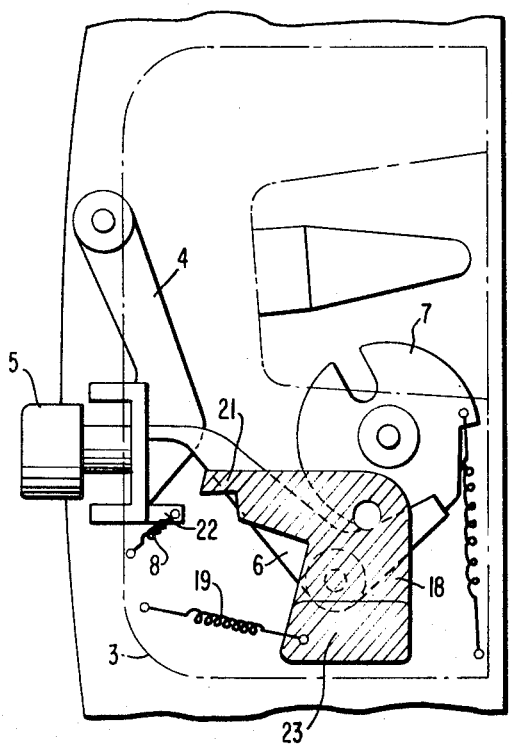
FIG. 5 is a door lock equipped in accordance with the invention, with a lever providing formfitting blockage of movements due to inertial forces.

The lock mechanism disposed between the outer door metal panel 1 and the inner door metal panel 2 within the lock housing 3 consists essentially of the outer lock button 5 projecting out of the outer door panel, the actuating lever 4 of the lock, an elbow lever 6 actuated by the lever 4, and a spring loaded latch member 7 arrested by the elbow lever 6. The control lever 4 and the elbow lever 6 are held in their normal locked positions as seen in FIG. 1 by springs 8 and 9. Furthermore, in accordance with the invention a two-armed lever 10 is rotatably mounted in the lock housing 3. In the rest position, the lever 10, which carries a counterweight 11 on its free lever arm, presses on the control lever 4 by means of the force of spring 12 to further maintain the parts in the locked position.

For opening purposes, the outer lock button 5 is pressed inwardly, so that the control lever 4 rotates the elbow lever 6 in a clockwise direction, whereby the latch member 7 is released. The latch member 7 executes a rotational movement in the direction of arrow 13 during this procedure. The two-armed lever 10 provided for balancing the inertial forces is likewise rotated by the control lever 4 against the force of spring 12 when the button 5 is depressed.

Upon the occurrence of an acceleration due to an impact on the lock, but not on the button 5, in the transverse direction of the vehicle from the outside toward the inside, for example, in case of an accident (FIG. 3), the impact power or percussive force is substantially effective in the direction of arrow 14 on the latch member 7, which, however, is not able to rotate due to the locking engagement with lever 6. This inertial forces of the other movable parts of the door lock caused by the acceleration by the impact or the like, are effective against the opening direction of the lock mechanism, i.e., in the direction of arrow 15, thereby maintaining these elements in their locked position, so that the danger of a spontaneous opening of the lock is nonexistent. The two-armed lever 10 carrying the counterweight 11 has imparted to it, in case of this direction of acceleration, a rotational movement which is counterclockwise, since the counterweight 11 swings in the direction of arrow 15, due to the acceleration. This movement does not affect the locked position of the other movable parts, and the force is absorbed by the spring 12.

In case of a shock or impact on the lock in the transverse direction of the vehicle from the inside toward the outside, the movable parts of the lock mechanism are this time accelerated in the direction of their opening movement. Such an acceleration can occur, for example, during an accident or upon a vigorous slamming of the door, whereupon the door could spring open. During such a strain, the impact force is effective on the lock in the direction of arrow 16 in FIG. 4. In this case, the spontaneous opening of the door is prevented by the counterbalancing force of the counterweight 11 oriented this time in the direction of arrow 17, which counterweight is now effective on the outer lock button by means of its lever arm to maintain the actuating lever 4 and elbow lever 6 in their locked positions against the applied accelerating force.

By such an arrangement for compensating for the applied inertial forces, the safety of the lock with respect to spontaneous opening is substantially increased, without appreciably complicating the operation of the lock.

The lock of FIG. 5 is of essentially the same construction as the lock of FIGS. 1—4. Here again, there are provided a control lever 4 operable by an outer lock button 5, an elbow lever 6, and a spring loaded latch member 7. Any spontaneous opening of the lock due to the inertial forces of the movable parts of the lock mechanism which are subjected to high accelerations is prevented in this embodiment by formfitting engagement, by means of which any movement of the parts of the lock mechanism upon the occurrence of an acceleration in the opening direction is blocked. For this purpose, an asymmetrical, two-armed elbow lever 18 is disposed within the lock housing 3, which elbow lever is maintained in its rest position illustrated in FIG. 5 by means of a spring 19.

Figure 7:
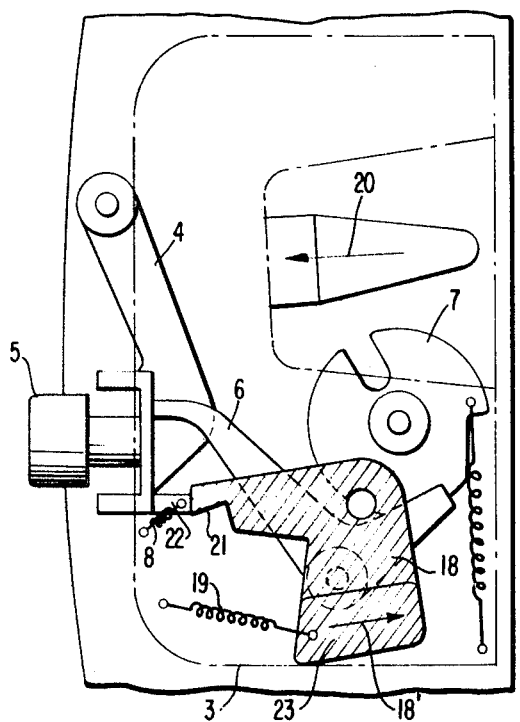
FIG. 7 shows the door lock of FIG. 6 when under stress due to accelerations.

By an impact on the lock in the transverse direction of the vehicle from the inside toward the outside, for example on account of an accident or upon vigorous slamming of the car door, an acceleration in the opening direction occurs while the lock is under a load in the direction of arrow 20, as seen in FIG. 7. By this acceleration, the elbow lever 18 is rotated or swung in the direction of arrow 18' by a certain amount and then opposes with its lug 21 a stop 22 provided on the opposed end of actuating lever 4, so that any possible opening movement of the lock mechanism, and particularly actuating lever 4, will be blocked. Of course, after the shock has passed, the spring 19 will again return the lever 18 to its rest position, as seen in FIG. 5.

Figure 6:
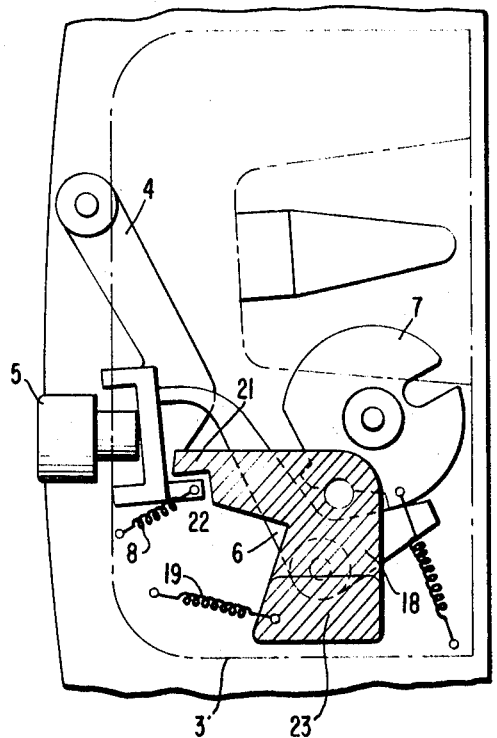
FIG. 6 shows the door lock of FIG. 6 when under stress due to accelerations.

In contrast thereto, when the lock is intentionally opened, the stop 22 of the outer lock button 5 is moved past the lug 21 of the elbow lever 18, as seen in FIG. 6, since the spring 19 maintains the elbow lever 18 in its rest position where the lug 21 is positioned above or out of opposition to the stop 22.

The advantage of this solution resides in that high inertial forces can be absorbed with small counterweights 23 on the elbow lever 18, since rather than oppose the force directly, the weights need merely effect a free swinging of the lever against the bias of spring 19 through a small rotation until lug 21 is positioned opposite the stop 22 to prevent its movement against the rigid pivot thereof. Therefore, the principle is especially suited for space-saving constructions.

While we have shown and described two embodiments in accordance with the present invention, it is understood that the same is not limited thereto but is susceptible of numerous changes and modifications as known to a person skilled in the art, and we therefore do not wish to be limited to the details shown and described herein but intend to cover all changes and modifications as are within the scope of those skilled in the art.

We claim:

1. A lock, especially a safety door lock for automotive vehicles, for securing the locked position of the door against being opened due to substantially transverse impact forces on the vehicle, characterized in that the door lock has a latching mechanism and inertia equalizing means associated with said latching mechanism and comprising spring-loaded lever means which are adjusted against the spring load, in case spring-loaded mass accelerations affecting the vehicle transversely, due to the inertia of said lever means in such a manner that movement of said latching mechanism between a first latching position and a second unlatching position is prevented.

2. A lock as defined in claim 1, wherein said lever means includes a two-armed lever having a counterweight formed at one end of one arm thereof, the other arm of said lever being positioned for movement in the path of said latching mechanism against movement thereof due to inertial forces from said first latching position to said second unlatching position.

3. A lock as defined in claim 2, wherein said inertia equalizing means further includes a spring connected to said two-armed lever to bias said other arm of said lever into contact with said latching mechanism.

4. A lock as defined in claim 3, wherein said counterweight is dimensioned to provide a given acceleration value sufficient to oppose translation of said latching mechanism due to inertial forces.

5. A lock as defined in claim 1, wherein said lever means includes a two-armed lever having a counterweight formed at one end of one arm thereof, said lever being positioned with the other arm thereof normally adjacent to the translational path of said latching mechanism so as to be rotatable by inertial forces on said counterweight into said translational path to block movement of said latching mechanisms, 6. A lock as defined in claim 5, wherein a spring is connected to said two-armed lever to bias said lever into its normal or rest position.

7. A lock as defined in claim 6, wherein the pivot of said two-armed lever is positioned on a line passing through the point of contact of said other arm with said latching mechanism and coextensive with the direction of attempted movement of said mechanism in the blocking position of said lever.

8. A lock as defined in claim 1, wherein said latching mechanism includes a pivotable latch actuating member and operating means manually translatable between said first and second positions for actuating said latch actuating member, said lever means being responsive to inertial forces for preventing pivoting of said latch actuating member.

9. A lock as defined in claim 8, wherein said latch actuating member is a first lever arm in contact with said operating means and pivotable in a first direction thereby, said lever means being provided in the form of a second two-armed lever having a counterweight on one arm thereof, the other arm of said second lever being positioned in contact with said first lever arm for movement in response to inertial forces in a direction opposite said first lever arm thereby preventing pivoting thereof in said first direction due to said inertial forces alone.

10. A lock as defined in claim 9, wherein said inertia equalizing means further includes a spring connected to said second lever to bias said other arm thereof into contact with said first lever arm.

11. A lock as defined in claim 8, wherein said latch actuating member is a first lever arm in contact with said operating means and pivotable in a first direction thereby said lever means being provided in the form of a second two-armed lever having a counterweight on one arm thereof, the other arm of said second lever being positioned adjacent the path of travel of said first lever arm and movable in response to inertial forces on said counterweight into blocking contact with said first lever arm.

12. A lock as defined in claim 11, wherein the pivot of said two-armed lever is positioned on a line passing through the point of contact of said other arm with said first lever arm and coextensive with the direction of attempted movement of said first lever arm.